US006555943B2

(12) United States Patent
Walther et al.

(10) Patent No.: US 6,555,943 B2
(45) Date of Patent: Apr. 29, 2003

(54) GEARED MOTOR WITH A CONNECTOR FOR A BRUSH MOUNTING PLATE HAVING A GROUND BRUSH

(75) Inventors: Bernd Walther, Bietigheim-Bissingen (DE); Rolf Ade, Bietigheim-Bissingen (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 09/745,082

(22) Filed: Mar. 12, 2001

(65) Prior Publication Data

US 2001/0007401 A1 Jul. 12, 2001

(51) Int. Cl.[7] .............................................. H01R 39/38
(52) U.S. Cl. ........................ 310/239; 310/249; 310/83
(58) Field of Search ........................... 310/239, 83, 249

(56) References Cited

U.S. PATENT DOCUMENTS

| | | | | | |
|---|---|---|---|---|---|
| 3,885,847 A | * | 5/1975 | Thibeault | ...................... | 439/97 |
| 4,080,541 A | * | 3/1978 | Mazzorana | ............ | 123/179.25 |
| 4,166,206 A | * | 8/1979 | Deane et al. | ............... | 200/293 |
| 4,398,135 A | * | 8/1983 | Bush et al. | .................. | 318/443 |
| 4,614,886 A | * | 9/1986 | Schneider et al. | ............ | 310/83 |
| 4,623,764 A | * | 11/1986 | Petre et al. | ..................... | 174/51 |
| 4,807,587 A | * | 2/1989 | Baetschmann et al. | ........ | 125/1 |
| 4,851,730 A | * | 7/1989 | Fushiya et al. | ............. | 310/249 |
| 5,194,769 A | * | 3/1993 | Ade et al. | ...................... | 310/51 |
| 5,306,974 A | * | 4/1994 | Bates | ....................... | 310/68 R |
| 5,319,864 A | * | 6/1994 | Amonett | ...................... | 34/528 |
| 5,440,186 A | * | 8/1995 | Forsell et al. | ................ | 310/239 |
| 5,659,211 A | * | 8/1997 | Blanchet | ...................... | 310/42 |
| 5,717,271 A | * | 2/1998 | Aoki et al. | ................. | 310/242 |
| 5,734,219 A | * | 3/1998 | Horski et al. | ............... | 310/240 |
| 5,949,173 A | * | 9/1999 | Wille et al. | ................. | 310/220 |
| 5,952,763 A | * | 9/1999 | Bruhn | ........................ | 310/238 |

FOREIGN PATENT DOCUMENTS

| | | | |
|---|---|---|---|
| FR | 2672445 A3 | * | 8/1992 |
| JP | 09107651 A | * | 4/1997 |

* cited by examiner

*Primary Examiner*—Joseph Waks
(74) *Attorney, Agent, or Firm*—J. Gordy Lewis

(57) ABSTRACT

A geared motor includes an electric motor enclosed by a housing, a brush mounting plate having a plurality of brushes including at least one ground brush connected to ground and a connector element having a brush locator to accommodate an electrical connection to the ground brush and a ground locator to accommodate an element connected to ground. The ground locator is detachably connected directly with the grounded gear housing.

13 Claims, 5 Drawing Sheets

GEARED MOTOR WITH A CONNECTOR FOR A BRUSH MOUNTING PLATE HAVING A GROUND BRUSH

BACKGROUND

The invention concerns a geared motor, specifically a geared wiper motor for a vehicle, with an electric motor enclosed by a housing, with a gear located at the drive shaft of the electric motor enclosed by a gear housing, and with a brush mounting plate to hold brushes, where at least one ground brush connected to ground is present.

With geared motors of this type, the brushes are mounted on the brush mounting plate in such a way that the brushes ride on the outer edge of a current transformer in the electric motor. The ground brush is clinched with the grounded gear housing by means of a wire lead crimped into the gear housing. There can also be provision for clamping a plate connected to ground between the motor housing and the gear housing, where the ground brush is electrically connected with the ground plate.

A disadvantage of the present art is that crimping the wires in the gear housing or clamping the ground plate between the motor housing and the gear housing is not suited to mass production and results in an assembly that is not process-controlled.

The task on which the present invention is based is to develop a geared motor in which the connection between the ground brush and a grounded element is implemented with minimum manufacturing and assembly effort in a way that provides process control and functional reliability.

SUMMARY

This task is solved in the case of a geared motor [of the type named at the beginning under the invention] by providing a connector element at the brush mounting plate, which has at least one brush locator to receive an electrical connection to the ground brush and at least one ground locator to receive an element connected to ground. The advantage of the invention is that crimping the wires in the gear housing connected to the ground brushes is dispensed with. In addition, a ground plate between the motor housing and the gear housing is not necessary. By using the connector element at the brush mounting plate, an achievement of the invention is that, firstly, an electrical connection with the ground brush can be implemented at the brush locator. Secondly, the ground locator is connected to a grounded element, thereby also connecting the ground brush to ground. In the assembly of a geared motor of this type, for example, the brush mounting plate is pre-assembled with the individual brushes and the connector element in pre-assembly. In a second assembly step, the brush mounting plate is installed into the geared motor, where only the ground locator of the connector element has to be attached or connected to a grounded element in order to ground the ground brush.

A particularly advantageous embodiment of the invention is characterized by the brush mounting plate having a connector opening and the connector extending partially through the connector opening, where the brush locator is positioned on the side of the brush mounting plate facing towards the brushes, and the ground locator is positioned on the side of the brush mounting plate facing away from the brushes. This has the advantage of achieving a spatial separation of the ground locator from the brushes through the brush mounting plate. This can prevent mutually induced malfunctions, of the brushes on the one hand and of the ground locator on the other, or of the grounded element which is retained by the ground locator.

An advantage is that provision can also be made to provide a direct, separable attachment of the ground locator to the grounded gear housing. The geared motor can then be removed without difficulty, particularly in the event of damage. In addition, this dispenses with a part to join the ground locator to the gear housing, which can save costs.

Provision can also be made for the ground locator to accommodate a plug connector which is injection-molded to the gear housing. By means of a positive molded connector of this type, a connection between the plug connector and the gear housing can be insured that is process-controlled and functionally reliable.

A further development of the invention provides for the ground locator to be jaw-shaped with two flexible tangs to hold the plug connector. A positive connection is achieved between the ground locator and the plug connector by using tangs of this type. Specifically, guide sections can be provided on the ground locator and/or the plug connector, which permit a better, specifically a detachable push-fit of the ground locator onto the plug connector. Volume production can be carried out with process control and functional reliability.

In one variation of the invention, provision is made for the connector element to be clamp-mounted to the brush mounting plate. A clamp mount has the advantage that bolts, rivets, adhesives and similar materials are not needed to attach the connector element to the brush mounting plate. Elaborate crimping tools for crimping the connector element to the brush mounting plate can be dispensed with.

Furthermore, there is an advantage when provision can be made for the connector element to have at least one protruding tab in the center area for the clamp retainer. The connector element can be clamped positively to the brush mounting plate by means of a tab of this type.

In another embodiment of the invention, the brush locator positions the contact of an additional component, specifically a thermoswitch element, which is electrically connected with the ground brush. The ground brush is therefore not grounded directly, but indirectly through the thermoswitch element.

Another embodiment of the invention provides for the brush locator to be welded or soldered to the electrical connection for the ground brush and/or to the contact for the additional component. By means of this type of welding or soldering, a permanent connection is made between the brush locator and the ground brush, or the additional component, respectively, in a simple and economical way.

In a preferred embodiment of the invention, the connector element is manufactured from sheet metal. Through appropriate handling and bending of the sheet metal, a connector element with the desired properties can be realized with a relatively low cost outlay.

In another further development of the invention, the brush mounting plate is retained by being clamped between the gear housing and the motor housing. The advantage is that no additional fasteners, such as rivets or bolts, for example, are required to attach the brush mounting plate. Clinching the brush mounting plate to the gear or motor housing can also be dispensed with. Specifically, in order to achieve a weight reduction in the gear housing, the gear and/or motor housings can be made from magnesium or aluminum. Clinching the brush mounting plates to housings of this type is, besides, not process-controlled. With a clamped mount of this type for the brush mounting plate, the brush mounting plate is installed between the gear housing and the motor housing during assembly. As part of the invention, provision can be made that with installation of this type, the ground locator of the connector element is guided into the connector molded onto the gear housing, for example. Assembly of this type is practicable with minimum assembly cost.

Further, it is advantageous to have a seal ring between the brush mounting plate and the motor housing, where the brush mounting plate is clamped between the seal ring and the gear housing or the motor housing. The installation of a seal ring of this kind has the advantage that firstly, the motor housing to gear housing interface is sealed against external environmental factors and secondly, that clamping forces affecting the brush mounting plate are evenly distributed.

In a further preferred embodiment of the invention, the brush holder plate is made of impregnated paper. Impregnated paper has proven to be particularly advantageous in practice for brush holder plates.

DETAILED DESCRIPTION OF THE DRAWINGS

Additional/further advantageous embodiments and details of the invention can be found in the following description, in which the invention is described in greater detail and explained from the working example in the drawing.

DETAILED DESCRIPTION

Figure 1:
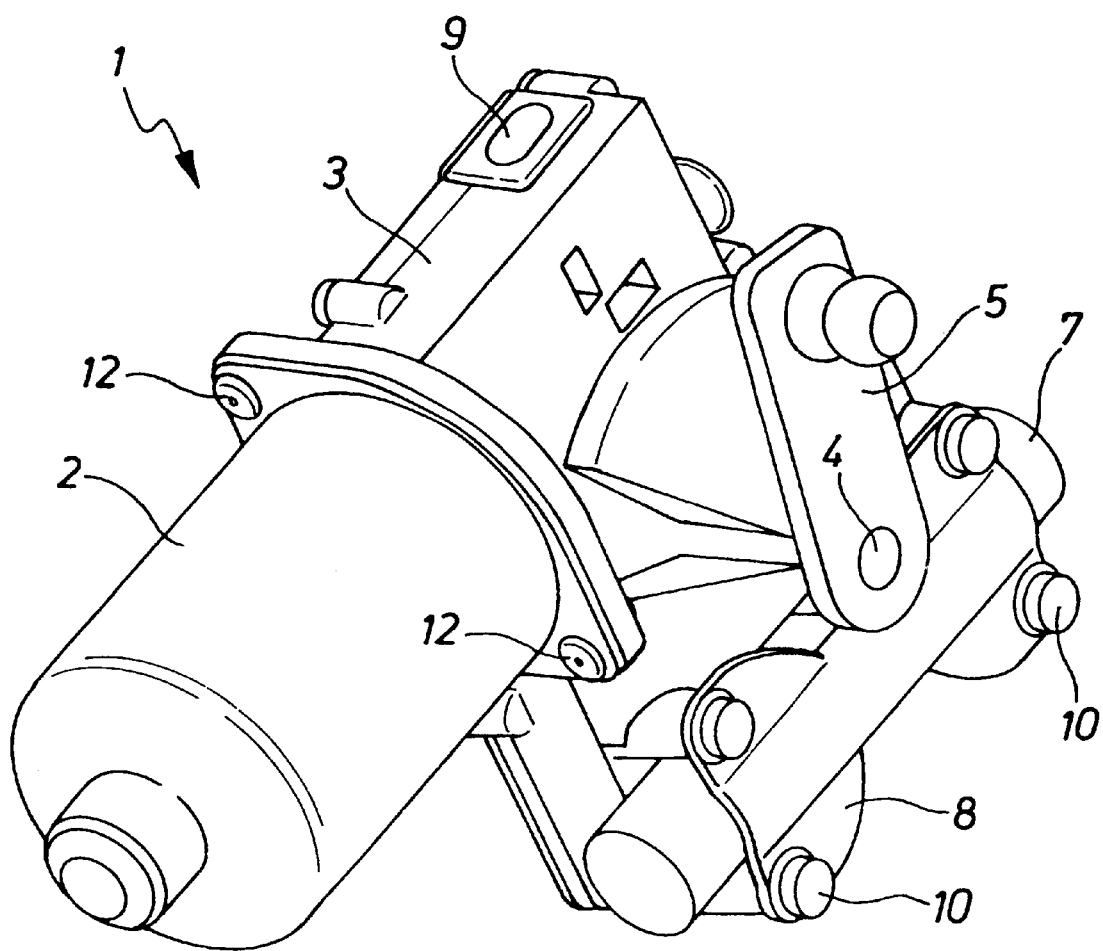
FIG. 1 is a perspective view of an inventive geared wiper motor for a vehicle.

The geared motor 1 of a wiper system for vehicles shown in FIG. 1 has an electric motor enclosed by a motor housing 2 and a gear located at the drive shaft of the electric motor, enclosed by a gear housing 3. The geared motor 1 has a crank 5 at the drive shaft 4 with a ball and socket joint; the crank 5 is designed to drive a wiper linkage which can be attached to the ball and socket joint, or to drive a wiper installation for wiping automobile windshields.

FIG. 1 also shows a tubular mount 7, to which the geared motor 1 is attached by means of a clamping plate 8. The mount 7 can be attached, for example, in a fixed position on the vehicle body. The clamping plate 8 is fastened to the gear housing 3 by means of four bolts 10. To provide additional support to the gear motor 1, an opening 9 is provided, into which, for example, a fixed bolt mounted to the vehicle can be inserted. The motor housing 2 is attached by means of two rivets 12 to the gear housing 3.

Figure 2:
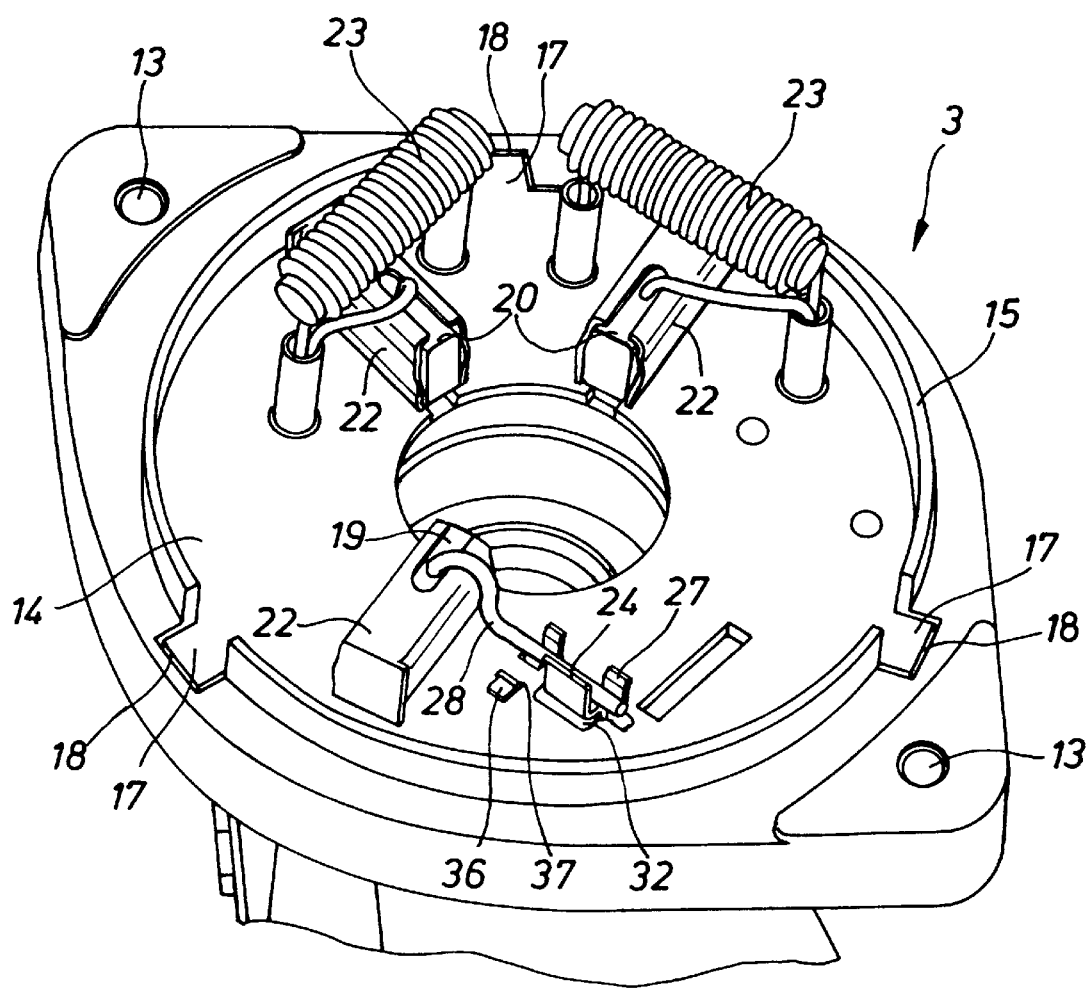
FIG. 2 is a perspective view of the side of the gear housing of the gear motor shown in FIG. 1 facing the motor housing.

In FIG. 2 the section of the barrel-shaped gear housing 3 which faces the motor housing is shown. There are two openings 13 on the gear housing 3 to receive the rivets 12 shown in FIG. 1. In addition, a brush mounting plate 14 is shown, which is installed into the open end of the barrel-shaped gear housing 3. To do this, the brush holder plate 14 has three rectangular lugs 17 on the side facing the gear housing 3, which are inserted into the notches 18 located on the gear housing 3. The notches match the lugs 17 in shape and size, so that the lugs 17 for the most part fill the notches 18 and for the most part fit flush with the surface of the gear housing 3.

A ground brush 19 and two carbon brushes 20, which are connected to a higher electrical potential, are mounted in suitable holders 22 on the brush mounting plate 14, which is preferably made from impregnated paper. In addition, two suppression coils 23 are located above the two carbon brushes 20 to suppress interference from the two carbon brushes 20.

The brush mounting plate 14 in this case is circular, where the brush mounting plate 14 largely matches the cross section of the barrel-shaped gear housing 3. With the geared motor in its assembled state, it is intended that the current transformer for the electric motor extends through the brush mounting plate 14, so that the ground brush 19 and the two carbon brushes 20 ride on the outer edge of the current transformer.

In FIG. 2 it can also be clearly seen that there is a lip 15 on the open side of the barrel-shaped housing 3, facing towards the motor housing 2. In the area where the notches 18 are located, the lip 15 has openings, through which it is possible to install the brush mounting plate 14 or the lugs 17 of the brush mounting plate 14 respectively into the notches 18. The primary function of lip 15 is to install the electric motor with the motor housing 2 onto the gear housing 3 without damaging components during assembly and to achieve functional reliability.

With the geared motor 1 in its assembled state, in which the electric motor with the motor housing 2 is attached to the gear housing by means of the rivets 12, the brush mounting plate 14 is clamped between the motor housing 2 and the gear housing 3. With this configuration, there can be a provision for installing a seal ring between the gear housing 3 and the motor housing 2, located on the side of the circumferential lip away from the brushes 19 and 20.

As can be clearly seen from FIG. 2, there is a connector element 24 on the brush mounting plate 14, which has a brush locator 27 to retain an electrical connection 28 with the ground brush 19. In addition, the connector element 24 has a ground locator 29, shown in FIGS. 4 and 5, which is intended to retain an element connected to ground.

Figure 5:
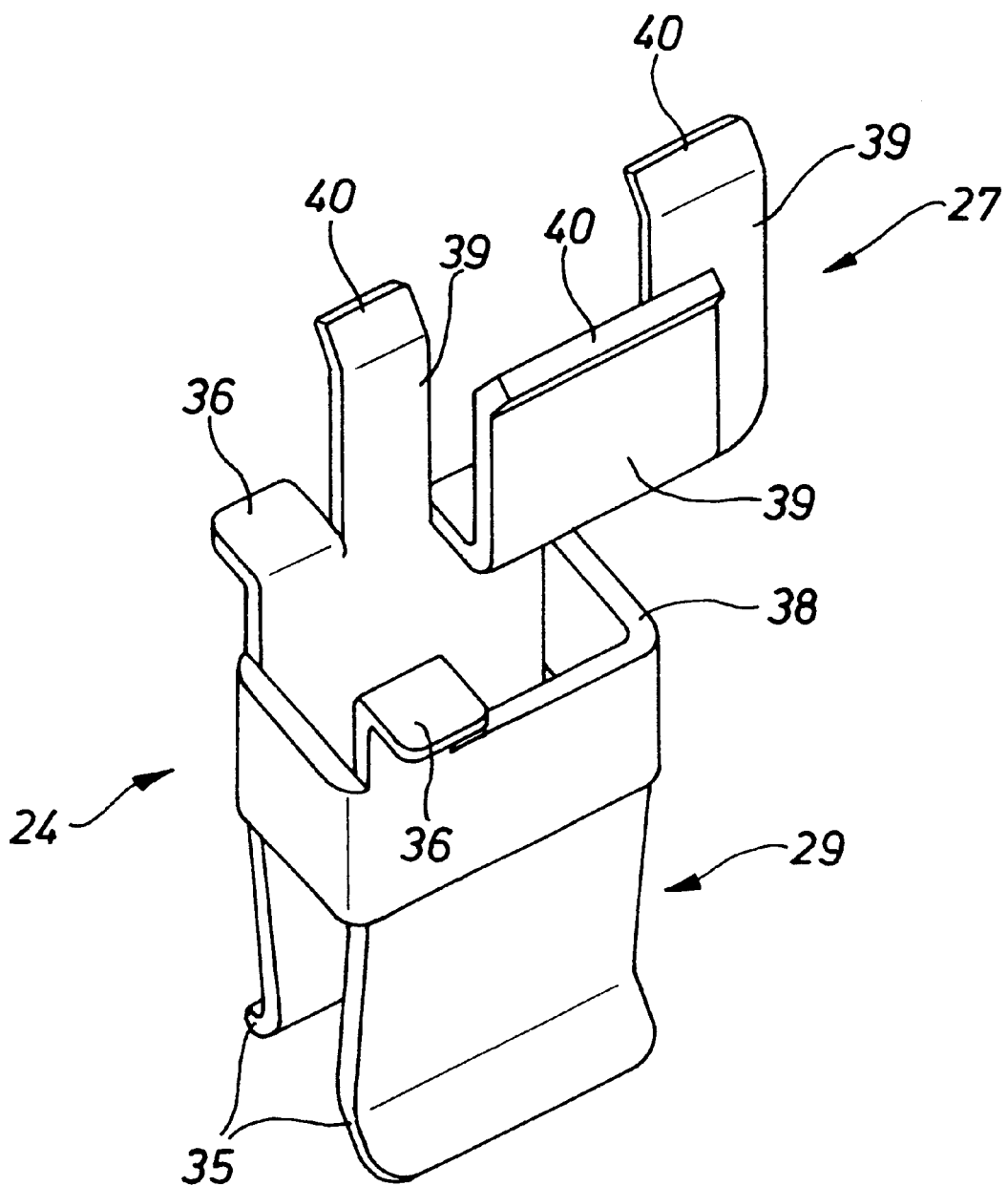
FIG. 5 is an enlarged, perspective view of a connector element in accordance with the invention.

In order to locate the connector element 24 on the brush mounting plate 14, the brush mounting plate 14 has a connector opening 32. The connector element 24 extends partially through the opening 32, an arrangement in which the brush locator 27 is positioned on the side of the brush mounting plate 14 facing toward the brushes 19 and 20, and the ground locator 29 is positioned on the side of the brush mounting plate 14 facing away from the brushes 19 and 20, as shown in FIG. 5.

Figure 3:
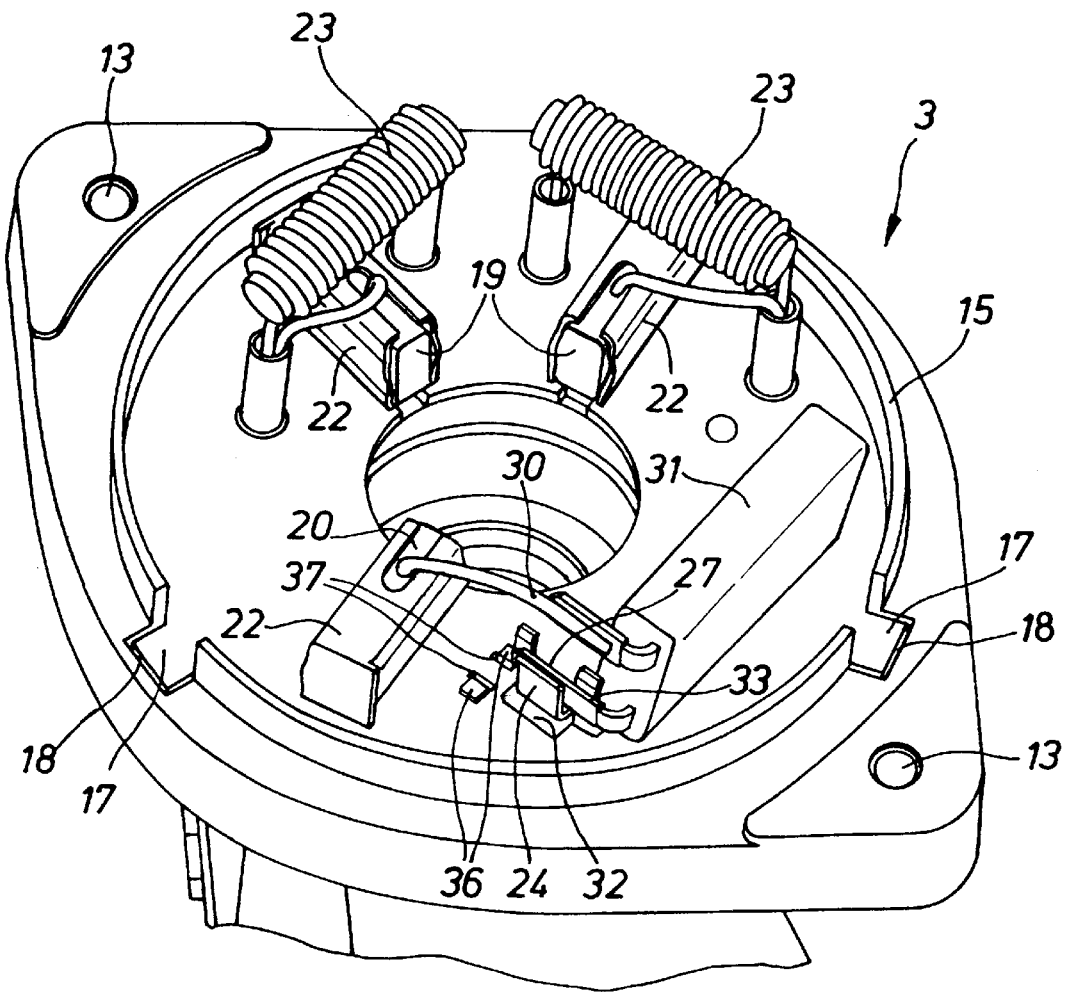
FIG. 3 is a perspective view of a slightly different configuration of the gear housing shown in FIG. 2.

In FIG. 3, which largely corresponds to FIG. 2, the electrical connection 28 for the ground brush 19 is not connected directly to the brush locator 27 of the connector element 24. Instead, an additional component, specifically a thermoswitch element 31, is located on the brush mounting plate 14, where the brush locator 27 makes the contact 33 to the thermoswitch element. The ground brush 19 is connected to ground through an electrical connection 30 and the thermoswitch element 31. In this configuration, provision can be made for the brush locating element 27 to be welded or soldered to the electrical connection 28 of the ground brush 19, as shown in FIG. 2, or to contact 33 of the thermoswitch element 31.

Figure 4:
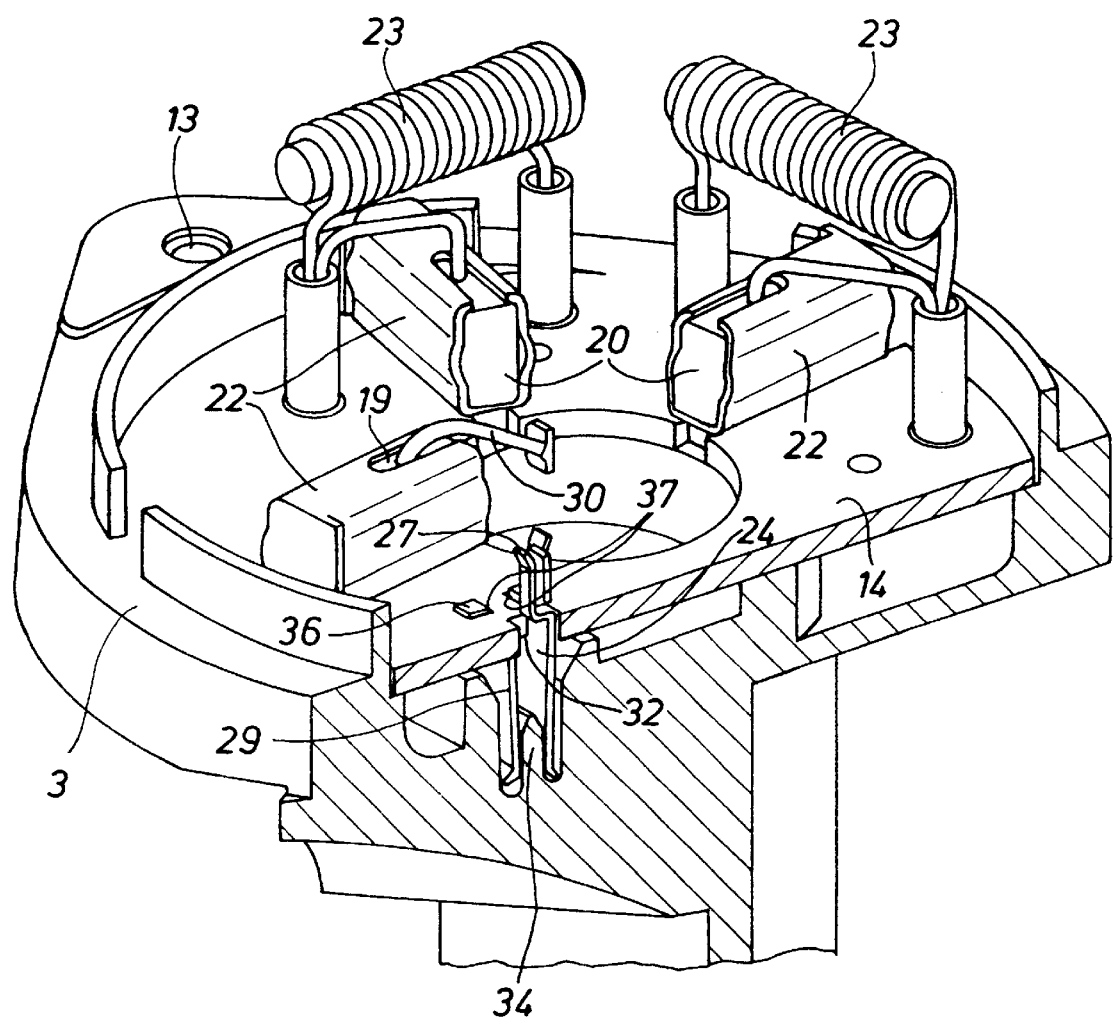
FIG. 4 is a partially cross-sectioned, perspective view of the gear housing of the geared motor of FIG. 3.

FIG. 4 shows a partial section through the gear housing shown in FIG. 3 with the brush mounting plate 14. It can be clearly seen that the ground locator 29 of the connector element 24 is attached directly to the gear housing 3, but is separable therefrom. The gear housing 3 has an injection molded plug connector 34, which is located by the ground locator 29. The ground locator 29, as can be seen particularly well in FIG. 5 also, has a jaw-like design, with two flexible tangs 35 to locate the plug connector 34.

To assemble the geared motor 1, the brush mounting plate 14 is installed into the barrel-shaped opening of the gear housing 3. The jaw-shaped locator 29 positions the plug connector 34, which is gripped on the side facing the brush mounting plate 14 for better retention of the locator. With the installation of the brush mounting plate 14, the connection is made between the ground brush 19 and the gear housing 3 which is connected to ground.

To retain the connector element 24 to the brush mounting plate 14, the connector element 24 has two protruding tabs 36 in the center area, which can be seen particularly clearly in FIG. 5. To assemble the connector element 24, the brush mounting plate 14 has slots 37, through which the tabs 36, which prior to assembly of the connector element 24 are not perpendicular to but lengthwise along the connector element, are inserted. In a subsequent assembly step, the tabs 36 are bent over, whereby the connector 24 is clamped to the brush retainer plate 14.

From FIG. 5 it is clear how the connector element 24 is constructed. A section 38 with a rectangular shape 29 is attached to the jaw-shaped ground locator 29 which has the two tangs 35. The tabs 36 and the brush locator 27 are located on the face of this section 38 that is facing away from the tangs 35. The brush locator 27 has a total of three segments 39, two of which segments 39 lie in one plane and the third segment 39 is located parallel to the first two segments 39. All the segments 39 have flared end sections 40 to make installation of the electrical connection 28 or the contact 33 for the thermoswitch element 31 easier. The advantage is that by designing the connector element 24 in this way, the connector element can be made from sheet metal by means of suitable bending.

All the properties presented in the description, the following claims and the drawing can be essential to the invention both individually, as well as in any combination.

What is claimed is:

1. A geared motor comprising:
   an electric motor enclosed by a motor housing;
   a gear located it a drive shaft of the electric motor enclosed by a gear housing;
   a brush mounting plate to locate brushes;
   at least one ground brush connected to ground; and
   a connector element on the brush mounting plate, the connector element further including at least one brush locator to accommodate an electrical connection to the ground brush and at least one ground locator to accommodate an element connected to ground, wherein the ground locator is detachably connected directly with the gear housing which is grounded.

2. The geared motor of claim 1 wherein:
   the brush mounting plate has a connector opening;
   the connector element extends partially through the connector opening; and
   the brush locator is positioned on the side of the brush mounting plate facing the brushes and the ground locator is positioned on the side of the brush mounting plate facing away from the brushes.

3. The geared motor of claim 1 wherein:
   the ground locator holds a plug connector molded to the gear housing.

4. The geared motor of claim 3 wherein:
   the ground locator has jaws with two flexible tangs to hold the plug connector.

5. The geared motor of claim 1 wherein
   the connector element is clamped to the brush mounting plate.

6. The geared motor of claim 5 wherein
   the connector element has at least one protruding tab to make a clamped retention.

7. The geared motor of claim 1 wherein:
   the brush locator accommodates a contact for an additional component electrically connected to the ground brush.

8. The geared motor of claim 7 wherein:
   the brush locator is fixed to the electrical connection of one of the ground brush and the contact of the additional component.

9. The geared motor of claim 1 wherein
   the connector element is manufactured from sheet metal.

10. The geared motor of claim 1 wherein:
    the brush mounting plate is clamped between the gear housing and the motor housing.

11. The geared motor of claim 1, further comprising:
    a seal disposed between the brush mounting plate and the motor housing, the brush mounting plate being clamped between the seal and one of the gear housing and the motor housing.

12. The geared motor of claim 1 wherein:
    the brush mounting plate is made of impregnated paper.

13. A geared motor comprising:
    a gear housing having a plug connector associated therewith;
    a brush mounting plate associated with the gear housing, the brush mounting plate including at least one ground brush connectable to ground and an aperture extending through the plate allowing access to the plug connector; and
    a ground locator separably attachable to said housing through said aperture to operably engage the plug connector with respect to a first side of the brush mounting plate opposite from the ground brush and a brush locator to position an electrical connector on a second side of the mounting plate facing the ground brush such that a ground connection is made between the ground brush and the gear housing through the aperture of the installed brush mounting plate.

* * * * *